No. 882,693. PATENTED MAR. 24, 1908.
A. KINGSBURY.
FRICTION CLUTCH.
APPLICATION FILED MAR. 6, 1905.
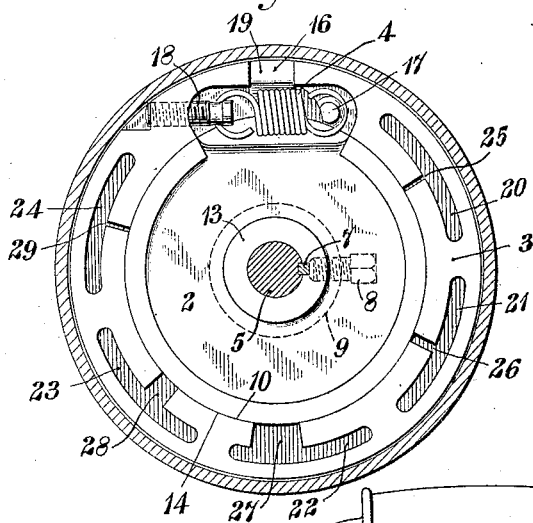
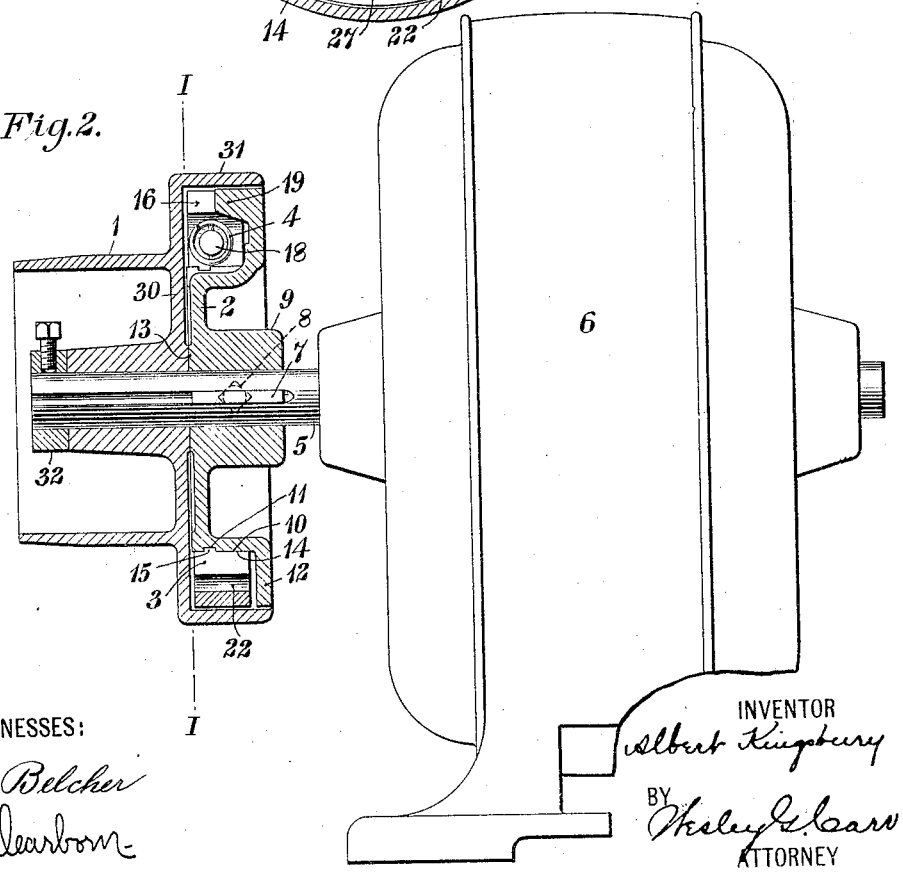
WITNESSES:
C. L. Belcher
R. J. Dearborn
INVENTOR
Albert Kingsbury
BY Wesley G. Carr
ATTORNEY

UNITED STATES PATENT OFFICE.

ALBERT KINGSBURY, OF PITTSBURG, PENNSYLVANIA, ASSIGNOR TO WESTINGHOUSE ELECTRIC & MANUFACTURING COMPANY, A CORPORATION OF PENNSYLVANIA.

FRICTION-CLUTCH.

No. 882,693.     Specification of Letters Patent.    Patented March 24, 1908.

Application filed March 6, 1905. Serial No. 248,737.

*To all whom it may concern:*

Be it known that I, ALBERT KINGSBURY, a citizen of the United States, and a resident of Pittsburg, in the county of Allegheny and State of Pennsylvania, have invented a new and useful Improvement in Friction-Clutches, of which the following is a specification.

My invention relates to friction clutches and particularly to such clutches as are dependent upon centrifugal action for their operation.

The object of my invention is to provide a clutch which shall be automatically adjustable to transmit energy to a rotatable member at various predetermined rates of shaft rotation in either direction with equal efficiency and which shall be inexpensive and simple in construction, and effective in operation.

As heretofore constructed, centrifugally operated friction clutches were usually dependent upon the movement of lever mechanism and attached weights, to cause a binding ring to engage an inner cylindrical surface of a coöperating member. With such devices the speed of shaft rotation at which a single clutch member would operate to engage its coöperating member, varied in different instances over comparatively wide limits and in many cases clutches apparently similar, and comprising similar parts throughout, showed wide differences in the speed of shaft rotation at which they actuated the driven member. These variations and the factor of uncertainty consequently introduced were due to the fact that any slight variation in the distance between the point of support and the point of application of the lever made a comparatively great variation in the action of the clutch, and the binding ring usually began to bear at a single point so that action was transmitted so suddenly as to cause a jerk on the pulley load. Furthermore, such devices do not operate with equal efficiency for both directions of shaft rotation.

My invention, which corrects the principal defects in centrifugally operated friction clutches, as formerly constructed, by insuring a more uniform contact between the friction ring and the coöperating member, and an operation which is uninfluenced by slight mechanical variations, is illustrated in the accompanying drawings of which Figure 1 is an end elevation of a clutch constructed in accordance therewith, the driven member being shown as a pulley and in cross-section on line I—I of Fig. 2, in order to disclose the clutch mechanism. Fig. 2 is a longitudinal, sectional view of a clutch pulley like that shown in Fig. 1 as applied to the shaft of an electric motor that is shown in side elevation.

My invention, as illustrated, comprises in general a driven member 1, a supporting disk 2, a friction ring 3 and a holding spring 4.

The supporting disk 2 is rigidly fastened to the shaft 5 of a driving motor 6, by any convenient means; such for example, as a key 7 and a set screw 8 which engage the hub 9 of the ring and is provided with an annular surface 10 having an annular groove 11, an annular flange 12 and a slightly-projecting hub 13 which is opposite the hub 9.

The friction ring 3 is provided with an annular surface 14 and an annular projection 15 which engage, respectively, with the surface 10 and the groove 11 of the disk 2, when the clutch is at rest. A portion of the ring 3 is cut away to form an opening 16 which allows the ring to be sprung to slightly separate the ends of the remaining arc so that the projection 15 may be brought into engagement with the groove 11 in the supporting disk 2. The two ends of the ring 3 are drawn toward each other after the ring is in position on the supporting disk 2, by the spring 4 which is fastened to one of said ends by a pin 17 and to the other end by a screw 18 which may be adjusted to vary the tension of the spring. A projection 19 on the disk 2 engages the opening 16 in the ring 3 and serves to prevent rotation of the ring 3 upon the disk 2.

The ring 3 is provided with a plurality of curved slots 20, 21, 22, 23 and 24 which are concentric with the outer and inner surfaces of the ring and are approximately equally spaced in the remaining material of the ring after provision is made for the spring 4 and its supports. The portion of the ring 3 between the slots 20, 21, 22, 23 and 24 and the inner surface 14 is cut to form radial slots 25, 26, 27, 28 and 29 the dimensions and location of which are determined by the amount of material that must be removed in order to statically balance the ring. The radial slots materially increase the flexibility of the ring without decreasing its weight to any considerable extent.

The member 1 embodies a disk 30 that is perpendicular to the center line of the shaft 5, and is provided with an annular projection or flange 31 at its edge, the inside diameter of which is slightly greater than the normal outside diameter of the ring 3 so that when the member 1 is on the shaft 5 to which the disk support 2 is keyed, the flange 31 fits loosely over the ring 3 and the hub engages with the disk 30 to prevent lateral movement of the member 1 along the shaft toward the motor. A ring 32 may be fastened to the shaft in the usual manner to keep the member 1 from moving along the shaft 5 in the other direction. As the ring 3 reaches a predetermined rate of speed, corresponding to the speed of the shaft 5 of the driving motor 6, it is thrown out, by the centrifugal force exerted upon it and caused to engage the flange 31 of the member 1 which is consequently driven by reason of such frictional engagement.

Inasmuch as the ring 3 is not attached at any point to the coöperating member of the clutch and is of substantially uniform structure throughout its length, the frictional contact between the annular faces of the clutch members will be uniformly distributed and will vary in accordance with the speed of shaft-rotation in each direction.

I desire and intend to cover and include herein all variations in form, dimensions and combinations of the parts shown and described that do not effect a material change in mode of operation or result.

I claim as my invention:

1. The combination with an annular clutch member and a shaft on which said member is rotatably mounted, a supporting device keyed to said shaft, and a concentrically and radially slotted ring mounted upon said supporting device and expansible by centrifugal force exerted solely through its own weight to engage the annular clutch member.

2. The combination with an annular clutch member and a shaft upon which said member is rotatably mounted, of a supporting device keyed to the shaft, a concentrically and radially slotted ring mounted upon the supporting device having its ends connected by a spring which normally clamps the ring to the supporting device and the pull of which is overcome by centrifugal force when the shaft attains a predetermined speed.

3. The combination with a shaft having a supporting device fastened thereto, and a normally loose member having an annular flange, of a concentrically and radially slotted split ring mounted upon the supporting device inside the flange of said loose member and held against all except radial movement and expansible against the flange by centrifugal force, and a spring for connecting the ends of the ring together.

4. The combination with a shaft and a divided ring provided with a plurality of similar concentrically curved slots and a plurality of radial slots of such widths as to effect a static balance, said ring being so supported by the shaft as to have no independent rotative movement, of a normally loose member having an annular flange that projects over the ring to be engaged thereby when the ring is expanded.

5. The combination with a shaft, a split metal ring having concentrically curved and radial slots and supported by said shaft against independent rotative movement and a spring that connects the ends of the ring together, of a normally loose member having a flange that projects over said ring to be engaged thereby when the ring is expanded by centrifugal force exerted solely through its own weight.

6. The combination with a shaft and a normally loose member mounted thereon and having an annular flange, of a metal ring having slots concentric with its inner and outer surfaces, and radial slots extending from the concentric slots to the inner surface of the ring and a supporting member that is fastened to the shaft and upon which the ring is mounted in proximity to the flange of the loose member.

7. The combination with a shaft and a normally loose member having an annular flange, of a spring ring that is divided at one point and has an otherwise unbroken outer surface in proximity to the annular flange and is provided with a plurality of curved slots extending through it from end to end and with radial slots between the curved slots and the inner surface, a support for the ring, and means for normally clamping the ring to its support.

8. In a clutch, an expansible one-piece annular clutch member provided with a plurality of slots of such relative dimensions and so distributed as to statically balance the member and insure operation thereof by centrifugal force and friction with substantially uniform efficiency for both directions of rotation.

In testimony whereof, I have hereunto subscribed my name this 28th day of February, 1905.

ALBERT KINGSBURY.

Witnesses:
M. L. RUNNER,
BIRNEY HINES.